United States Patent Office 3,031,313
Patented Apr. 24, 1962

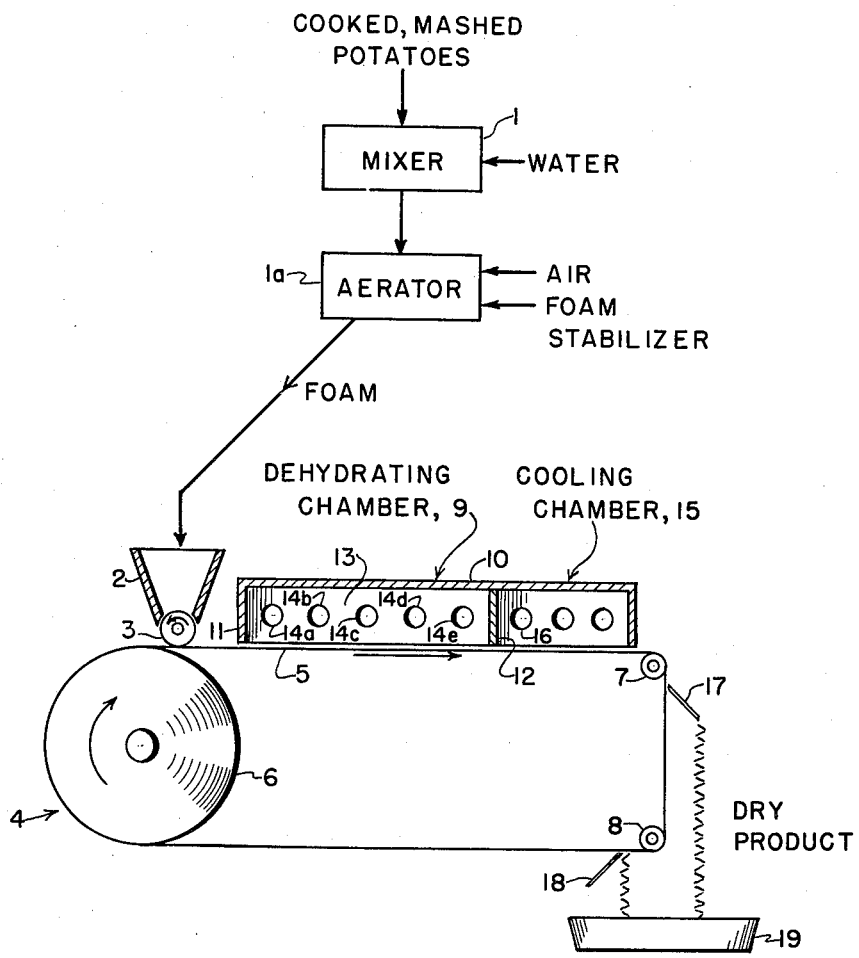

3,031,313
DEHYDRATION OF FRUITS AND VEGETABLES
Arthur I. Morgan, Jr., Berkeley, Lewis F. Ginnette, San Leandro, and Robert P. Graham, El Cerrito, Calif., assignors to the United States of America as represented by the Secretary of Agriculture
Filed Feb. 3, 1960, Ser. No. 6,575
10 Claims. (Cl. 99—206)
(Granted under Title 35, U.S. Code (1952), sec. 266)

A non-exclusive, irrevocable royalty-free license in the invention herein described, throughout the world for all purposes of the United States Government, with the power to grant sublicenses for such purposes, is hereby granted to the Government of the United States of America.

This invention relates to and has among its objects the provision of novel processse for dehydrating fruits and vegetables. A particular object of the invention is the provision of processes which yield dehydrated products in a porous and easily rehydratable form. These characteristics are a significant advantage in that the products are quickly and easily prepared for consumption. Further objects and advantages of the invention will be apparent from the annexed drawing and the following description, wherein parts and percentages are by weight unless otherwise specified.

The single figure in the annexed drawing depicts schematically a flow sheet of the process of the invention and apparatus with which it may be carried out.

In conventional methods of dehydrating fruits and vegetables a problem which commonly arises is that the products exhibit poor rehydration characteristis. For example, the mere subjection of the produce to conventional dehydrating conditions, such as exposing it to hot air, yields products of poor rehydration properties. Thus, during the drying the product becomes hard and glassy so that it defies penetration of water. It has been advocated that fruit pieces be dehydrated under vacuum to yield a product of porous texture. Although this procedure gives improved results, it requires expensive equipment because the drying apparatus must be in a vacuum-tight system and the maintenance of the vacuum by steam ejectors or the like during the dehydration involves a considerable expense.

In accordance with the present invention, the dehydration is accomplished under normal (atmospheric) pressure instead of under vacuum. Despite this radical departure, the dehydrated products are in a porous condition and therefore rehydrate rapidly and completely when contracted with water in preparing them for the table. Moreover, the dehydration is accomplished without significant damage to the chemical composition, color, flavor, texture, and nutritive content of the starting material. Since the dehydration is carried out at normal pressures, relatively inexpensive equipment may be used and operating expenses are minimized.

The process of the invention is particularly adapted for the production of dehydrated potatoes. This product on mixing with hot water (or other hot edible liquid) instantly forms mashed potatoes of a desirable mealy texture like those prepared from freshly cooked potatoes. There is no pastiness as with inferior dehydrated potato products. The process of the invention not only yields a high quality dehydrated potato product but eliminates many of the cumbersome steps required in current methods of producing dehydrated potato granules. For example, current procedures involve such steps as partial dehydration prior to final drying; conditioning for long periods to decrease pastiness; and add-back, that is, the continued re-circulation of a substantial portion of the final product as "seed" to facilitate proper dehydration. All of these steps, which add substantially to manufacturing expense, are eliminated by the process herein described.

In carrying out the process of the invention, the solid raw material—which may be any type of fruti or vegetable—is reduced to a pulp. Conventional mechanical procedures, such as mashing, pressing, chopping, grinding, or the like, may be employed to achieve this end. Usually, it is preferred to cook or at least blanch the raw fruit or vegetable prior to pulping. This has the advantage of inactivating enzymes and softening the tissue so that the pulping can be done more easily without damage to individual cells. Also, cooking is desirable, for instance with vegetables, so that the final product will be in a pre-cooked state and will merely require rehydration to be table-ready. Having prepared a pulp, this material is diluted, where necessary, with water to the proper consistency and is then converted into a stable foam by incorporating therewith a minor proportion of a foam-stabilizing agent and a substantial volume of air or other gas. The foam so produced in the form of a relatively thin layer, or small extruded pieces, is then exposed at normal (atmospheric) preessure to a current of a hot gaseous medium until it is dehydrated.

The foam consists of a body of the pulp throughout which is interspersed a multitude of gas bubbles. The presence of the bubbles gives the foam a volume substantially greater than that of the pulp, per se. During the dehydration step, the mass of foam retains this expanded volume with the result that the final product is a brittle, sponge-like, porous mass consisting of a matrix of solid fruit or vegetable material in which is interspersed a multitude of voids. This porous mass can be readily crushed without damage to individual cells to form a product in the form of porous particles. These particles on admixture with water or other edible liquid form a reconstituted product free from lumps, grit or other non-rehydrated particles. The fact that the pulp is applied to the dehydration in the form of a foam and that the volume thereof is essentially maintained during dehydration are keys to the formation of the easily rehydrated porous product. Moreover, by such means the dehydration takes place rapidly and efficiently because moisture can diffuse readily out of the expanded mass.

The process of the invention may be applied to fruits and vegetables of all kinds, typical examples being apples, oranges, pears, peaches, plums, grapes, pineapples, cherries, apricots, berries, potatoes, sweet potatoes, squash, tomatoes, cabbage, peas, beans, watercress, etc. Generally the starting material is fresh produce but the process can be extended to processed foods, for example, raisins, dried figs, dried dates, dried prunes, etc. To reduce the fruit or vebetable to a pulp one may utilize any of the conventional techniques involving, for example, pressing, mashing, chopping, grinding, etc. Skins, peels, etc. may be removed prior to pulping or after pulping by screening. Generally it is preferred to cook or at least blanch the produce prior to pulping by contact with hot water, steam, or steam-air mixtures. Such treatment inactivates enzymes and so prevents discoloration and flavor damage. Also, the tissue is softened so that the pulping can be accomplished more easily and with less damage to individual cells. In the case of potatoes and sweet potatoes, cooking is preferred as it permits the product to be formed into a mash without rupture of individual cells. Such rupture is undesirable as it allows migration of starch particles wherheby on reconstitution the product would form a pasty mass rather than the desired mealy texture. Instead of, or in addition to blanching or cooking, preservative agents such as ascorbic acid, sodium bisulphite, sodium sulphite, or the like, may be added to the fruit or vegetable material. Fat-stabilizing agents such as nordihydroguaiaretic acid, ascorbyl palmitate, butylated hydroxy anisole, or the like may be added twhere the product contains natural fats, essential oils, or other components prone to oxidation on storage of the final product.

Having prepared the fruit or vegetable pulp, this material is formed into a foam as described in detail below. Depending on the nature of the fruit or vegetable material, it may be necessary to dilute the pulp with water so that it will be sufficiently liquid to be foamed readily. Thus, for example, when potatoes or sweet potatoes are cooked and mashed, the resulting mash must be diluted with water to the consistency of a sauce or paste so that the foam-stabilizer and gas may be incorporated therein. With fruit or vegetable products of a high water content, for example, leafy vegetables, the pulp may not require dilution. In any particular case, whether or not dilution is needed can be ascertained by inspection of the plup. For example, if the pulp is a discontinuous mass of solid particles, it requires dilution with sufficient water to establish a mass consisting of solid particles surrounded by a continuous liquid phase. Usually, sufficient water is added to bring the pulp to a liquid state like that of a sauce or paste. Where the pulp already has such form, dilution is not indicated.

In preparing the foam, a foam stabilizing agent is added to the pulp and air or other non-toxic gas such as nitrogen, carbon dioxide, nitrous oxide, helium, propane, n-butane, isobutane, dichlorodifluoromethane, trichloromonofluoromethane, trifluoromonochloromethane, etc. is incorporated therein. The chemical nature of the foam stabilizing agent is of no moment to the operability of the invention as long as the agent possesses the ability to stabilize foams. Various examples of suitable agents are listed hereinafter. The proportion of foam stabilizing agent will vary depending on the properties of the pulp, the properties of the agent in question etc. In general, the proportion of the agent may vary about from 0.1 to 5.0%, by weight based on the weight of solids in the pulp. It is naturally desirable to use the lowest proportion of foam stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

Incorporation of the gas into the pulp containing added foam stabilizing agent may be accomplished by any of the conventional methods used, for example, in aerating ice cream, salad dressings, and the like. A simple and efficacious expedient is to subject the pulp to a rotating wire whip which beats air into the material. Another plan is to pump the pulp through a conduit, a portion of which is of restricted cross-section to form a venturi, the gas being introduced at the zone of high velocity and low pressure within the venturi and so thoroughly commingled with and dispersed into the pulp. For best results, it is preferred that the gas bubbles in the foam be of uniform small size, i.e., about 100 microns or less in diameter. The proportion of gas incorporated into the pulp is generally regulated so that the foam has a volume at least 1.5 times that of the pulp prior to introduction of the gas. It is usually preferred that the foam have a volume about 2 to 3 times the volume of the pulp to ensure formation of a highly porous dehydrated product. The foam volume may be increased above these levels to obtain even more highly porous products. Usually, however, it is desirable to limit the volume increase to about 5 times the original volume to avoid getting products having too low bulk density. That is, if excessive amounts of gas are added, the dehydrated products although otherwise completely suitable from the standpoint of rehydration, taste, and color, etc. will require too large a container to package a unit weight of product.

The pulp may be cooled during introduction and dispersion of the gas therein; this generally promotes formation of a stable foam. If cooling is employed, any temperature below room temperature may be used provided the mass is not cooled enough to freeze it. Accordingly, temperatures not lower than about 35° F. are recommended.

Having prepared a foam as above described, the foam is spread out in a relatively thin layer and subjected to dehydration at atmospheric pressure by contact with a hot gaseous medium. The thickness of the layer of foam may be varied. Generally, layers about 0.01 to 0.5 inch thick give satisfactory results. The layer of foam may take the form of a continuous web or sheet or of extruded rods having a diameter of about from 0.01 to 0.5 inch. Air is generally used as the gaseous dehydrating medium and excellent results are obtained therewith. However, if desired, oxygen-free gases may be employed to avoid any possibility of oxidation of the product. In such event, one may use inert gases such as nitrogen; carbon dioxide; helium; or combustion gases, for example, the gaseous residue from burning of natural gas containing nitrogen, carbon dioxide, residual methane, etc.

Various types of equipment may be used for the dehydration. For example, one may use a conventional cabinet dryer wherein trays bearing the layer of foam are subjected to a current of hot gaseous medium. The trays may be imperforate or even of screen material if the openings are not over about $\frac{1}{16}$ inch. The foam will not pass through perforations of such screens. Continuous dehydrators of various types may be used, for example, driers equipped with mechanical drive arrangements to move a support bearing a layer of the foam through the apparatus while it is contacted with currents of hot gas moving in concurrent, countercurrent, or crosswise directions. The drier may be compartmentalized so that the advancing support bearing the foam may be subjected to gas currents at different velocities, temperatures, and directions. A preferred form of continuous drier is described in detail hereinbelow. The dehydration equipment, whether of batch or continuous type, may be provided with infra-red or other radiant heaters to radiate heat directly onto the foam to provide auxiliary heat to the foam during dehydration. For a similar result, one may employ devices for supplying heat, by radiation or conduction, to the support on which the foam is spread.

In the dehydration, the temperature of the gaseous medium may range from about 120 to about 220° F., the higher temperatures in this range providing more rapid elimination of moisture. As noted hereinabove, a critical feature of the process of the invention is that the volume of the foam is retained during dehydration; thereby the final product is in a porous, easily rehydrated form. To ensure such a result, the foam layer may be kept under observation during dehydration and the temperature of the gas reduced if the foam shows a tendency to decrease in volume. Thus, although it is desirable to use a high temperature to obtain a rapid elimination of moisture, the temperature should not be so elevated as to cause any substantial reduction in the volume of the foam. It is impossible to set forth numerical temperature limits in this connection because the stability of the foam will depend on many factors including efficacy of the foam stabilizing agent, temperature of the foam, moisture content of the foam, size of gas bubbles in the foam, rate of heating of the foam, softening temperature of the product, etc. However, in any particular instance the gas temperature may be controlled in accordance with visual observation and this system of control affords a more reliable guide than could numerical limits.

It is evident that during the dehydration the temperature of the product will rise and eventually equal that of the hot gas stream. To avoid possibility of decomposition by the product assuming too high a temperature, it is preferred to lower the gas temperature in the final stage of the dehydration. Thus, for example, the gas temperature in the final stage of dehydration may be at a maximum of 120 to 160° F. whereby the product temperature will not rise above these limits.

After carrying out the dehydration as described above there is produced a solid dehydrated product having essentially the same volume as the foam and in a porous, spongy form. The product will generally have a moisture content of about 5%, or less. Generally it is preferred to cool the dehydrated product before removing it from the tray, belt, or other equipment on which it was dehydrated. The cooling may be effected by contacting the product with a current of cool, preferably dry, air or other gas as exemplified above. Generally, the dehydrated product is cooled to about 70–100° F. and in such condition is especially brittle and easy to remove from the surface on which it is located. The product breaks up on contact with spatulas or scrapers into a mass of flakes or particles. In such form the product is ready for use of packaging, or additional crumbling to smaller sizes may be needed.

As noted hereinabove, a foam stabilizing agent is incorporated into the pulp so as to enable preparation of a stable form. A multitude of such agents are known and the invention encompasses the use of any of them. The foam stabilizer may be a surface active agent or a hydrophillic colloid or a mixture of the two.

Typical examples of classes of surface active agents and individual compounds which may be used are listed below—

Fatty acid monoesters of inner ethers of hexitols, the fatty acids containing at least six carbon atoms. Illustrative of this class are sorbitan monolaurate sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monosterate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R—CO—(OC_2H_4)_n—OH$$

where R—CO is the acyl radical of a fat acid such as lauric, palmitic, oleic, stearic, etc. and $n$ has a value from 6 to 60.

Condensation products of ethylene oxide with long-chain aliphatic alcohols, i.e., compounds of the formula $$R—(OC_2H_4)_n—OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose disterate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphenate, sodium tetradecane sulphonate, sodium hexadecane sulphonate, sodium octadecane sulphonate, sodium oleyl sulphonate.

Alkylaryl sulphonates such as the sodium alkyl

benzene sulphonates. Typical in this class are sodium dodecyl benzene sulphonate and sodium hexadecyl benzene sulphonate.

Alkyl esters of sulphosuccinic acid, for example, the sodium salt of diostyl sulphosuccinate.

Sulphonated or sulphated fatty acid esters or amides, i.e., compounds of the types:

RCO—O—CH$_2$—CH$_2$—SO$_3$Na
RCO—NH—CH$_2$—CH$_2$SO$_3$Na
RCO—O—CH$_2$—CH$_2$—OSO$_3$Na and RCO—NH—CH$_2$—CH$_2$—OSO$_3$Na, wherein RCO— represents the acyl radical of a long-chain fatty acid such as lauric, myristic, palmitic, stearic, oleic, etc.

Condensates of ethylene oxide and alkyl phenols, that is, compounds of the type: R—C$_6$H$_4$—(OC$_2$H$_4$)$_n$OH wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hydrodesoxycholic acid, dehydrodesoxycholic acid, lithocholic acid, glycocholic acid, or taurocholic acid.

It will of course be appreciated that the particular surface active agent for use in the process of the invention will be selected according to the use which is to be made of the final product. Thus where the product is intended for edible purposes, the surface active agent selected will be one which is edible or at least which may be ingested without adverse effects. Thus for the production of edible products, we prefer to use surface active agents of the class of fatty acid esters of sorbitan or mannitan, agents of the class of polyoxyethylene sorbitan (or mannitan) fatty acid esters, agents of the class of polyoxyethylene derivatives of higher fatty acids, e.g., polyoxyethylene monosterate, agents of the class of sucrose mono- or diesters with higher fatty acids, agents of the class of glycerol monoesters of higher fatty acid esters, agents of the class of glycerol monoesters of higher fatty acid esters, agents of the class of bile salts, etc.

Generally it is preferred to employ surface active agents in order to stabilize the foam for dehydration since these agents are especially effective even when employed in very small proportion, for example, from 0.1 to 2% by weight based on the weight of solids in the pulp. However, the foam stabilizer may be a mixture of a surface active agent and a hydrophilic colloid or may be a hydrophilic colloid alone.

Typical examples of hydrophilic colloids which may be employed are: albumin, dried egg-white, dried glucose-free egg-white, gelatin, sodium gluten sulphate, sodium gluten phosphate, polyvinylpyrrolidone, polyvinyl alcohol, soluble starch, sodium carboxymethyl cellulose, methyl cellulose, agar, gum tragacanth, gum arabic, gum acacia, gum karaya, carragheen, alginic acid, sodium alginate, pectin, dextran, dextrin, sodium carboxymethyl starch, sodium carboxymethyl amylose, sodium carboxymethyl amylopectin, pentosans, etc. Generally, it is preferred to employ as the hydrophilic colloid, water-dispersible proteins such as albumin, dried egg-white preparations, or the like.

A preferred method of incorporating the foam stabilizer into the fruit or vegetable pulp involves the following steps. A minor portion of the pulp is separated and heated, usually to about 150–180° F., and into it is incorporated the required amount of foam stabilizer with sufficient stirring to form a uniform dispersion of the stabilizer in the pulp. The resulting dispersion is then mixed with the remainder of the pulp and the resulting mixture foamed and dried as described above. This technique is preferred as only a minor proportion of the pulp need be heated, that is, the portion used to disperse the foam stabilizer. The major portion to which the dispersion is subsequently added is not heated and may be at room temperature. This results in the advantage that possibility of heat damage to flavor, color, etc. is minimized because only a minor portion of the pulp is heated. Also, the amount of agitation required to disperse the foam stabilizer into the pulp is minimized—this prevents cell damage which, in the case of potatoes, for example, would lead to a product which yields a sticky product on reconstitution. In applying this technique, it is merely necessary to separate from the total batch of pulp, sufficient of the pulp required to form a smooth dispersion of the quantity of foam stabilizer required to be added to the total batch. The amount of pulp to be separated will vary depending on the characteristics of the pulp and the foam stabilizer; in many cases it will be about one-tenth to one-twentieth of the total batch. Since the separated portion is heated, it is desirable to use the minimum amount required to form a smooth dispersion of the foam stabilizer. After formation of the dispersion, this is incorporated into the remaining major portion of the batch of pulp which need not be heated. The technique is particularly applicable when employing the more difficultly-dispersible foam stabilizers, particularly the esters of the higher fatty acids, for example, glycerol esters, sorbitan or mannitan esters, sucrose esters, ethylene oxide condensation products with sorbitan or mannitan esters, and the like. This preferred method of incorporating the foam stabilizer is illustrated in Example 3, below.

The process of the invention is further explained as follows, with reference to the annexed drawing:

Raw potatoes are peeled, cut into slabs, cooked, mashed and fed into mixer 1 wherein they are mixed with sufficient water to form a thick liquid mass of a solids content of about from 10 to 20%, preferably 15%. This liquid is then fed into aerator 1–a which may take the form of a conventional device commonly used for aerating ice cream, salad dressings, or the like. Air and a foam stabilizer are likewise fed into aerator 1–a to provide a foam of the proper volume and stability. The liquid, now in the form of a foam, is fed into hopper 2 of dehydrator 4.

Dehydrator 4 includes a flexible, endless belt 5 made of smooth material, e.g., glass fibers coated with polytetrafluoroethylene, which is tautly disposed about drum 6 and rollers 7 and 8. Drum 6 is driven by suitable mechanism to continuously traverse belt 5 in the direction shown.

Hopper 2 and driven feed roller 3 extend in width essentially the same distance as the width of belt 5. Roller 3 in cooperation with hopper 2 deposits on belt 5 a thin layer of the foam. By suitable adjustment of the position of hopper 2 and roller 3 above belt 5 and control of the speed of feed roller 3, the foam is deposited in a thin layer on the order of 0.01 to 0.2 inch thick.

The layer of foam on belt 5 is carried through dehydrating chamber 9 wherein it is dehydrated by contact with hot air. Dehydrating chamber 9 takes the form of a bottomless compartment, essentially as wide as belt 5, and is formed by top plate 10, end plates 11 and 12, and side plates 13, only one of the latter being shown in the drawing. Ports 14a, 14b, 14c, 14d, and 14e are provided for introduction of hot air. This hot air flows transversely across the layer of foam causing it to be dehydrated, forming a solid, porous product. Ports or other suitable vents are provided in the opposite side wall 13 of chamber 9 not shown in the drawing. It is evident that the length of chamber 9, i.e., the distance from plate 11 to plate 12, is long enough to permit the layer of foam to be dehydrated in the time of its passage through the chamber. Chamber 9 is not sealed from the atmosphere and the pressure therein is essentially normal atmospheric pressure.

The temperature of the hot air entering dehydrating chamber 9 via ports 14a, 14b, etc., as explained hereinabove is high enough to effectuate a rapid elimination of moisture from the foam yet not so high as to cause any substantial reduction in the volume thereof. The air temperature may be controlled in accordance with visual observation of the material undergoing dehydration and for this purpose, the walls of chamber 9 may be provided with windows, sight glasses, or the like. A metal support for belt 5 may be used between drum 6 and pulley 7. This support may be conductively heated by steam or electricity to provide additional heat to the foam layer from below.

It is evident that as the layer of foam passes through chamber 9, its temperature will rise and eventually equal that of the hot air stream. To minimize alteration of the natural flavor by the product assuming too high a temperature, it is preferred to employ hot air at reduced temperature during the final stages of the dehydration. For example, the air entering adjacent to the exit end of the dehydrating chamber, for instance through ports 14d and 14e may be at a maximum of about 120–160° F. whereby the product temperature will not rise above these limits. Suitable partitions similar to vertical plate 12 may be provided within chamber 9 to delineate the zones having hot air at different temperature levels.

After leaving dehydrating chamber 9, the dehydrated product is next transported by the belt to cooling chamber 15 which is constructed essentially the same as dehydrating chamber 9. Ports 16 are provided to contact the dehydrated product with a current of cool air. Chamber 15 is not sealed from the atmosphere and the pressure therein is essentially normal or atmospheric pressure. The product as it leaves the dehydrating chamber is generally in a plastic state and would be relatively difficult to remove from the belt. By applying cooling the product is put into a brittle state which facilitates its removal from the belt. Air having a low humidity is preferably employed in the cooling step to prevent moisture regain by the dry product. Generally, the volume and temperature of the air circulated through chamber 15 are so regulated to reduce the product to a temperature of 100° F. or below, usually to about room temperature (70° F.).

The cool, dehydrated product is then carried by belt 5 about rollers 7 and 8. These rollers are deliberately of a small size so that the belt is subjected to a sudden change in direction. Belt 5 being of flexible, rubbery material is able to repeatedly negotiate this abrupt turn without damage. However, the cooled, dehydrated product, being now in a brittle condition, is cracked into pieces and dislodged from the belt as it traverses rollers 7 and 8. The product now in the form of flakes or pellicles falls into receiver vessel 19. Doctor blades 17 and 18, spaced a small distance from the surface of belt 5, assist in freeing the loosening particles of product.

An important feature of the apparatus lies in the method of dislodging the dehydrated product from the belt 5. This method involves traversing the belt in a path which involves an abrupt change in direction. As a result the outer fibers of the belt are stretched relative to the inner fibers with the result that the product, being brittle, is cracked into fragments and dislodged from the belt. The desired effect is readily attained by conducting the belt over a guide member—such as a roller—with a change in direction or turn of at least 60°. The thickness of the belt and the radius of the guide member are so correlated that the outer fibers of the belt are elongated at least 5% relative to elongation of the inner fibers—those contacting the guide member. The following formula may be used to obtain the desired correlation:

$$\frac{r+t}{r} = e$$

wherein $r$ is the radius of the guide member, $t$ is the thickness of the belt, and $e$ is the ratio of the elongation of the outer fibers to that of the inner fibers. In using the formula, the values $r$ and $t$ are so chosen that $e$ has a value of 1.05 or more. For example, if the belt is 0.1 inch thick, a guide member having a radius of 2 inches will produce a relative elongation of 1.05, that is, the outer fibers will be stretched 5% more than the inner fibers. A greater degree of stretch, say 10%, would be obtained with the same belt conducted over a guide member having a radius of one inch. Inasmuch as this stretching of the outer fibers of the belt is employed to release the dehydrated product, it is necessary that the belt be made of elastic material so that it may withstand this stress without damage. Use of the above-described method of removing the dehydrated product from the belt offers the particular advantage that the use of belt-contacting scrapers or doctors is eliminated. Such devices rarely give satisfactory results because they score the belt surface and usually leave a thin film of dried material which, as it builds up with continued operation, interferes with proper operation and may contaminate the product with particles of hard, varnish-like dried material.

The invention is further demonstrated by the following illustrative examples:

*Example 1*

Potatoes were peeled and quartered. They were then blanched in steam and air at 190° for one hour. They were pressed through a 10-mesh screen and mixed with half their weight of water. This resulted in a thick paste. To 300 parts of this paste, one part of glyceryl monostearate was added in the form of a 20% alcoholic solution. This mixture was whipped at room temperature for five minutes in a double eggbeater mixer. The result was a stiff foam of 0.45 g./ml. density. The foam was spread on a tray in a layer ⅛ inch thick. This layer was dried in a 160° F. air stream for 60 minutes. The resulting dry mat was pressed through a 10-mesh screen. This product was capable of rapid rehydration in hot water to form good quality mashed potatoes.

*Example 2*

The process of Example 1 was repeated except that the foam stabilizing agent was added in a different manner. Thus, one part of glyceryl monostearate was added to nine parts of water at 180° F. This mixture was stirred violently for one minute. After cooling to 80° F., the mixture was again stirred rapidly. The result was a stiff emulsion. One part of this emulsion was added to 300 parts of the diluted potato mash at room temperature and the mixture whipped to a foam and dried as described in Example 1.

*Example 3*

Potatoes were peeled, quartered, and blanched by contact with a steam-air mixture at 190° F. for one hour. They were then pressed through a 10-mesh screen and mixed with half their weight of water. This resulted in a thick paste containing about 15% solids.

To 20 parts of this potato paste at 180° F. was added one part of glycerol monostearate. The mixture was stirred violently for one minute, then cooled to room temperature. The mixture was then mixed into 180 parts of the potato paste at room temperature. The resulting mixture was whipped to a foam and dried as described in Example 1.

Having thus described the invention, what is claimed is:

1. A process for preparing a dehydrated product which comprises mashing a solid comestible selected from the group consisting of fruits and vegetables to a pulp, diluting the pulp, where necessary, with water to form a thick liquid mass, incorporating therein a gas and a minor proportion of a foam stabilizing agent to form a stable foam, spreading the foam into a relatively thin layer, contacting the layer of foam, at atmospheric pressure, with hot gaseous medium having a temperature, within the range about from 120 to 220° F., insufficiently high to cause the foam to substantially decrease in volume and continuing said contact of the hot gaseous medium with the foam until the foam is dehydrated to a solid, porous, readily rehydratable product.

2. A process for preparing dehydrated potatoes which comprises meshing freshly-cooked potatoes, mixing sufficient water with the mash to form a thick liquid containing about 15% solids, incorporating into the diluted mash a minor proportion of a foam-stabilizing agent, whipping air into the mixture to form a stable foam, spreading the foam into a relatively thin layer, contacting the layer of foam, at atmospheric pressure, with hot air having a temperature within the range about from 120 to 220° F., insufficiently high to cause the foam to substantially decrease in volume, and continuing said contact of the hot air with the foam until it is dehydrated to a solid, porous readily rehydratable product.

3. The process of claim 2 wherein the foam-stabilizing agent is a glycerol monoester of a saturated higher fatty acid.

4. The process of claim 2 wherein the foam-stabilizing agent is the glycerol monoester of palmitic acid.

5. The process of claim 2 wherein the foam-stabilizing agent is the glycerol monoester of stearic acid.

6. The process of claim 2 wherein the foam-stabilizing agent is an ester of sucrose and a higher fatty acid.

7. The process of claim 2 wherein the foam-stabilizing agent is sucrose dipalmitate.

8. The process of claim 2 wherein the foam stabilizing agent is sucrose monopalmitate.

9. A process for preparing dehydrated potatoes which comprises mashing freshly-cooked potatoes, mixing sufficient water with the mash to form a thick liquid containing about 15% solids, incorporating a foam stabilizer and a gas into the diluted mash to produce a foam, continuously applying the foam in the form of a thin layer on a flexible elastic support, continuously transporting said support bearing the layer of foam through a dehydration zone wherein the foam is contacted at normal atmospheric pressure with hot air having a temperature, within the range about from 120° to 220° F., insufficiently high to cause the foam to decrease in volume and continuing said contact of the hot air with the foam until the foam is dehydrated forming a solid, porous product, continuously transporting said support bearing the layer of dehydrated product through a cooling zone wherein the product is cooled at normal atmospheric pressure to a temperature below 100° F., continuously conducting said support bearing the layer of cooled, dehydrated product in a path which includes an abrupt change in direction whereby the cooled, dehydrated product is broken into pieces and dislodged from the support, and collecting the said product.

10. A process for preparing a dehydrated product which comprises mashing a solid comestible selected from the group consisting of fruits and vegetables to a pulp, diluting the pulp, where necessary, to form a thick liquid mass, segregating a minor portion of the liquid mass and incorporating therein a foam-stabilizing agent with application of heat to form a uniform dispersion of the foam-stabilizing agent, incorporating the resulting dispersion into the remainder of the liquid mass, without applying heat thereto, incorporating a gas into the liquid mass containing the foam-stabilizing agent to form a stable foam, spreading the foam into a relatively thin layer, contacting the layer of foam, at atmospheric pressure, with a hot gaseous medium having a temperature within the range about from 120 to 220° F., insufficiently high to cause the foam to substantially decrease in volume and continuing said contact of the hot gaseous medium with the foam until the foam is dehydrated to a solid, porous, readily-rehydratable product.

References Cited in the file of this patent

UNITED STATES PATENTS

| | | |
|---|---|---|
| 2,481,122 | Kaufman | Sept. 6, 1949 |
| 2,934,441 | Morgan | Apr. 26, 1960 |
| 2,955,046 | Morgan | Oct. 4, 1960 |